United States Patent [19]
DeSeversky

[11] 3,785,125
[45] Jan. 15, 1974

[54] MULTI-CONCENTRIC WET ELECTROSTATIC PRECIPITATOR

[76] Inventor: Alexander P. DeSeversky, Asharoken Beach, Northport, N.Y.

[22] Filed: Apr. 24, 1968

[21] Appl. No.: 723,810

Related U.S. Application Data

[63] Continuation-in-part of Ser. No. 53,255, Aug. 31, 1960, Pat. No. 3,716,966.

[52] U.S. Cl............ 55/119, 23/284, 55/122, 55/134, 55/146, 55/154, 55/223, 55/241, 55/DIG. 38, 261/76, 261/116, 261/DIG. 54, 423/237, 423/470
[51] Int. Cl............................................ B03c 3/78
[58] Field of Search.............. 55/134, 108, 117, 55/118, 119, 120, 122, 128, 134, 135, 139, 140, 146, 148, 150, 151, 154, 223, 241, DIG. 38; 23/284; 261/76, 116, DIG. 54; 423/237, 470

[56] References Cited
UNITED STATES PATENTS

| | | | |
|---|---|---|---|
| 2,631,684 | 3/1953 | Schmidt | 55/119 |
| 2,668,599 | 2/1954 | Whittet | 55/119 |
| 2,956,640 | 10/1960 | Tuche et al. | 55/118 |

FOREIGN PATENTS OR APPLICATIONS

| | | | |
|---|---|---|---|
| 463,504 | 4/1937 | Great Britain | 55/150 |
| 611,137 | 10/1948 | Great Britain | 55/150 |

*Primary Examiner*—Dennis E. Talbert, Jr.
*Attorney*—Michael Ebert

[57] ABSTRACT

A Multi-concentric wet electrostatic precipitator of large operating capacity, wherein concentric annular gas passages having the same radial dimensions are defined by a series of vertically-disposed, concentrically-arranged tubes of progressively increasing diameter, inner and outer surfaces of adjacent tubes which form the walls of the passages having downwardly-flowing, uniform liquid films produced thereon. A discharge-electrode structure is disposed in each annular passage, a high voltage being applied between the electrode structures in the several passages and their associated liquid films which act as collectors, thereby causing contaminants in a gaseous stream conveyed upwardly through the passages to be ionized and to migrate toward the films to be carried downwardly thereby for disposal, gas emerging from the upper end of the passage being free of contaminants.

1 Claim, 12 Drawing Figures

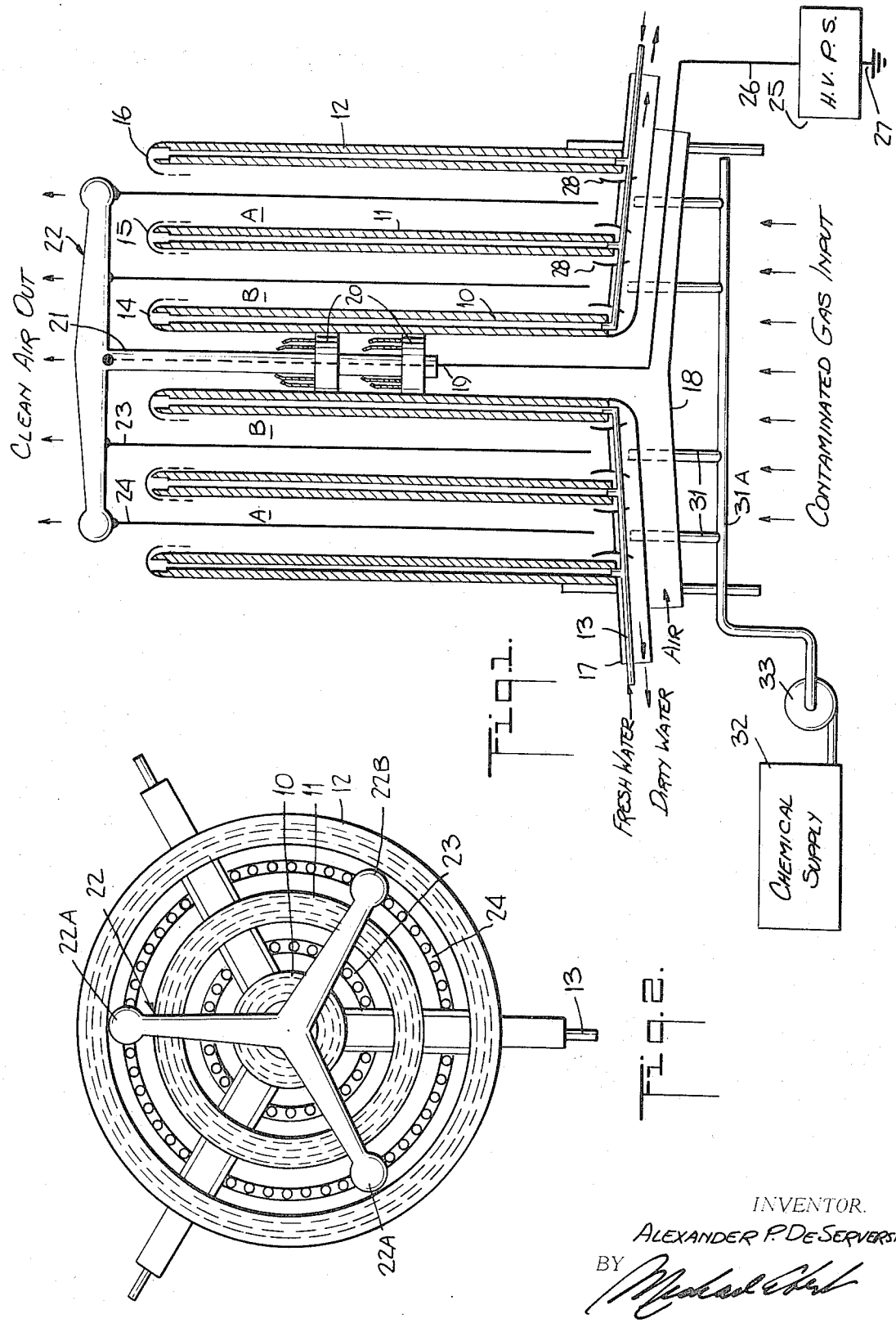

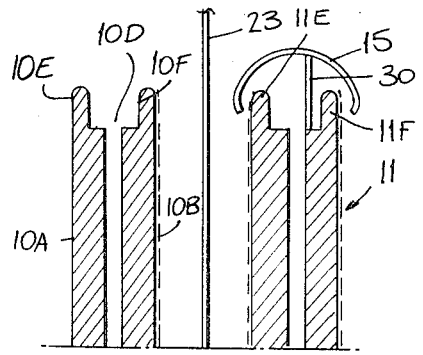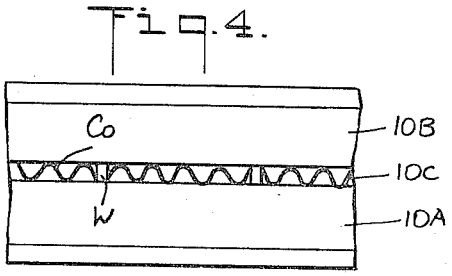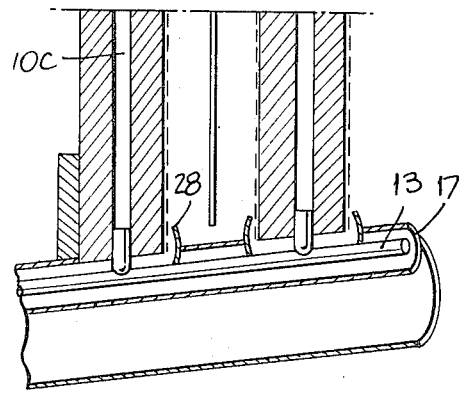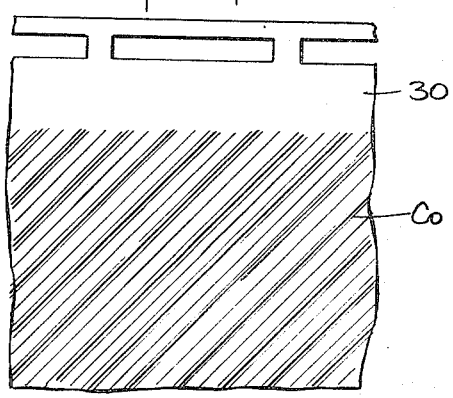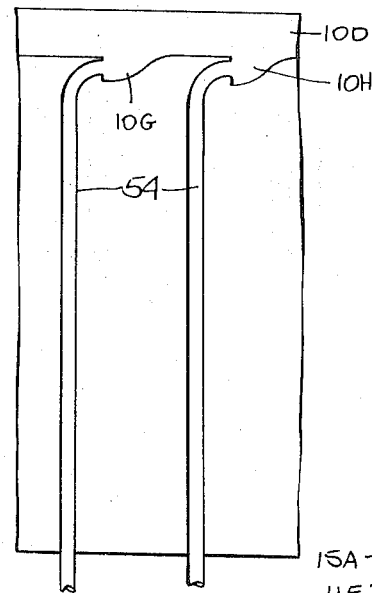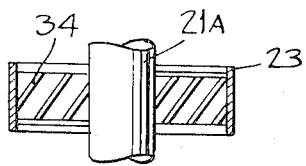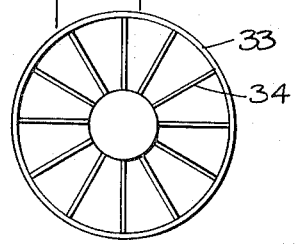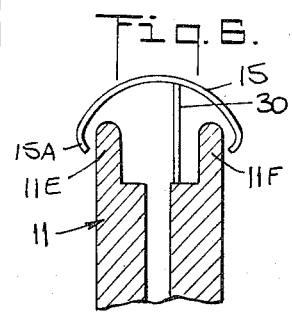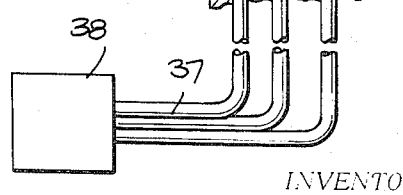
INVENTOR.
ALEXANDER P. DE SERVERSKY
BY
ATTORNEY

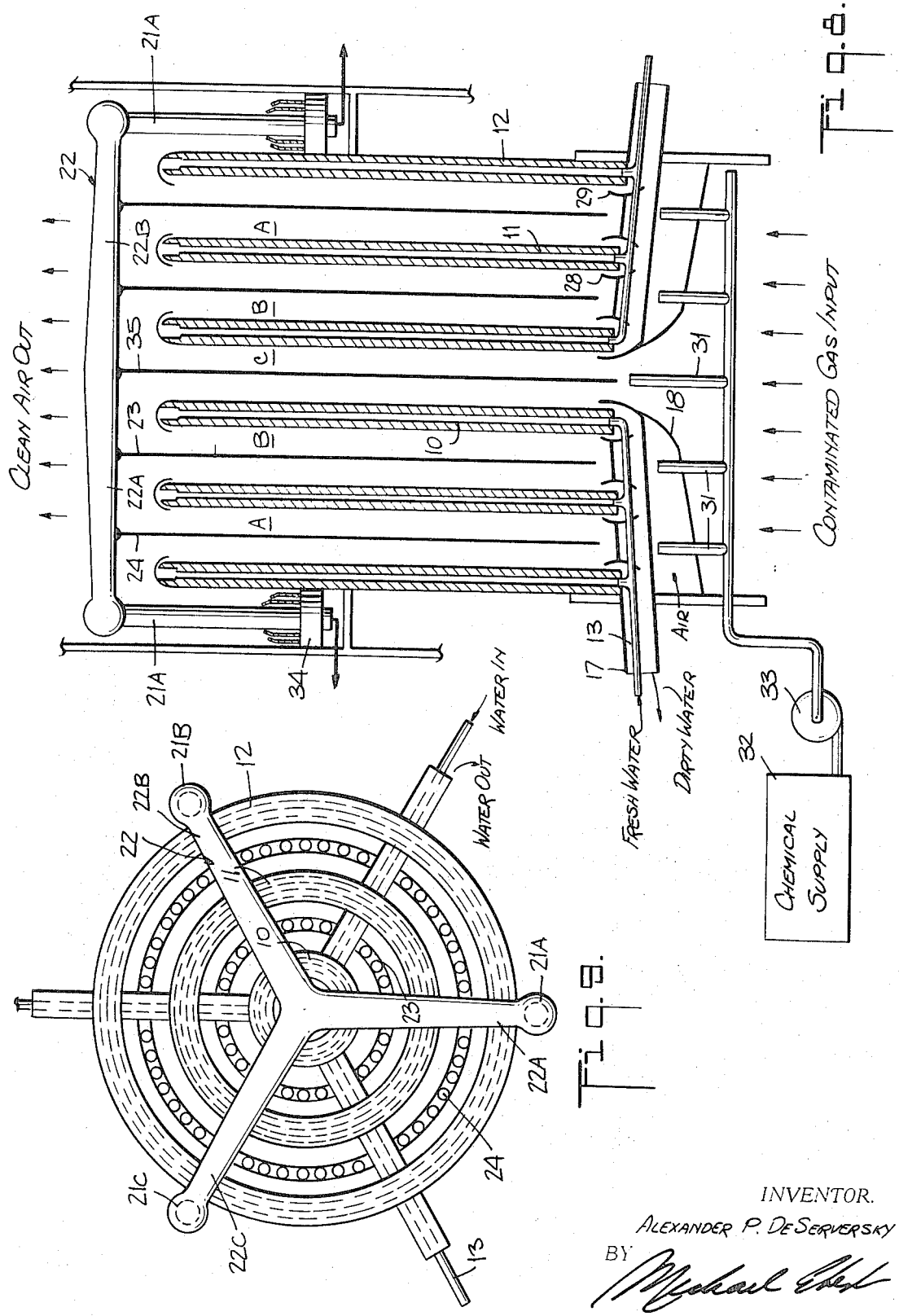

3,785,125

MULTI-CONCENTRIC WET ELECTROSTATIC PRECIPITATOR

RELATED APPLICATIONS

This application is a continuation-in-part of my co-pending application, Ser. No. 53,255, filed Aug. 31, 1960 now U.S. Pat. No. 3,716,966.

My invention relates generally to electrostatic precipitators for extracting particles of a solid or semi-solid nature, as well as toxic components, from air or other contaminated gaseous media, and more particularly to a multi-concentric wet electrostatic precipitator having a large operating capacity, which precipitator is self-decontaminating and is adapted to function efficiently for prolonged periods without servicing or maintenance.

The rise in atmospheric pollution in industrial centers and in heavily populated cities has become a matter of grave concern throughout the world. In larger metropolitan areas, a heavy volume of pollutants is discharged into the atmosphere by factories, power stations, hotels, apartment houses, and other industrial and non-industrial facilities which make use of heating systems, chemical processing equipment, incinerators, and other devices emitting combustion and waste products.

For purposes of reducing pollution, it is known to use electrostatic precipitators wherein impurity-laden gases, such as those issuing from a heating furnace, incinerator or an industrial outlet, are conveyed through a charged enclosure where they are subjected to an electrostatic field ionizing the particles and causing their migration from a discharge electrode to a collecting electrode which may be flat or tubular, thereby extracting the particles from the gas stream. With continued use, the particles accumulate on the surface of the collector electrode and on other exposed surfaces. It is therefore necessary at frequent intervals to decontaminate the structure. This requires a shutdown of precipitator operation in order to permit scraping of the agglomerated particles from the surfaces, or the use of vibratory cleaning, rapping or flushing. Thus the conventional electrostatic installation cannot function uninterruptedly and must be serviced at frequent intervals.

In my prior U.S. Pat. Nos. 2,937,709, 3,053,029, 3,238,702 and 3,315,444, there are disclosed wet electrostatic precipitators wherein the collecting surfaces are constituted by uniform films of water which carry away the particles. Precipitators of the type disclosed in my patents are to a large extent inherently self-cleaning. Being maintenance-free, they are particularly suited for precipitating complex particulate matter of the type encountered in some chemical plants, in apartment houses and municipal incinerators. They also may be advantageously used for extracting radioactive particles from the atmosphere in the case of fall-out, for these particles are carried away by the collecting liquid which may be safely stored or decontaminated.

In the above-identified co-pending application, there is disclosed a wet precipitator constituted by concentrically-arranged inner and outer tubes which define a single, vertically-disposed gaseous passage, a downwardly-flowing liquid film being produced on those surfaces of the tubes which line the passage. A high voltage is applied between a discharge-electrode structure mounted in the passage and liquid films which function effectively as collectors, whereby contaminants in a gaseous stream conveyed through the passage are ionized and caused to migrate toward the collector films to be carried downwardly thereby for disposal, a clean gas emerging from the upper end of the passage.

While there is a natural tendency for the liquid film to peel off the surfaces of the tubes which line the passage, particularly from the outer surface of the inner tube, an inlet Venturi through which the interflowing gas is fed into the lower end of the passage, brings about an expansion of the gas, the expanding gas moving in countercurrent relationship to the downwardly-flowing liquid film and functioning to force the liquid against the tube surfaces and thereby to maintain a uniform film thereon which promotes efficient precipitation.

When one seeks to enlarge the operating capacity of a wet precipitator of the type disclosed in said co-pending application, this cannot be done simply by increasing the diameters of the inner and outer tubes, for while an increase in the cross-sectional radial dimension of the annular passage will enlarge the over-all volume thereof and hence the operating capacity of the structure, it also raises the voltage requirements therefor beyond optimum values. The requisite voltage to effect electrostatic precipitation is determined by the spacing or air-gap between the discharge electrode and the collector films, and if this spacing, which is the radial dimensions of the channel, is increased to enlarge the capacity of the system, the voltage requirements may at the same time be raised well beyond practical limits.

The obvious way to enlarge the capacity of the system without changing the radial dimensions of the gas passage, is to maintain a given spacing between the inner and outer tubes while increasing the diameters thereof. Thus if a small precipitator is formed by an inner tube having a 40-inch diameter and an outer tube having a 50-inch diameter, a larger precipitator can be formed using tubes of 60 and 70 inch diameters, respectively, the radial dimension in both the small and large precipitators being 10 inches. However, as the dimensions are expanded in this manner, the amount of unused space within the interior of the inner tube is augmented, as a consequence of which the over-all dimensions of the precipitator become unduly large with respect to its operating capacity.

Accordingly, the main object of this invention is to provide a relatively compact wet electrostatic precipitator of large operating capacity, wherein waste space is minimized.

More specifically, it is an object of this invention to provide a multi-concentric precipitator formed by concentric annular channels all having the same radial dimension or air-gap, whereby the electrostatic voltage requirements for each channel are the same.

Also an object of the invention is to provide a wet electrostatic precipitator of efficient and reliable design, which may be built at relatively low cost and which operates for prolonged periods without the need for maintainance and servicing.

Briefly stated, these objects are attained in a precipitator wherein concentric annular passages having the same radial dimensions are defined by a series of vertically-disposed, concentrically arranged tubes of progressively increasing diameter, the inner and outer surfaces of adjacent tubes in the series thereof forming the linings of the annular flow passages and having downwardly-flowing, uniform liquid films produced thereon. Disposed in each passage is a discharge electrode cage or structure, a high voltage being impressed between the discharge electrodes and the associated liquid films, which act as collectors to cause contaminants in a gaseous stream conveyed upwardly through the passages to be ionized and to migrate toward the liquid films to be carried downwardly thereby for disposal, the gas emerging from the upper end of the passages being free of contaminants.

In a precipitator in accordance with the invention, because the contaminants are carried away by a thin uniform film of liquid, the device is capable of functioning simultaneously as a chemical reactor to create valuable compounds that can be extracted as by-products of air pollution control. The liquids may be acid, alkaline or possess any other chemical properties, so that extracted particulate matter which impinges in the liquid film can produce a desirable compound. Furthermore, vapor, mists, aerosols or particles may be injected in the gas stream at the venturi throat, changing the nature of the gases and, in some instances, converting them into particulate matter which can be precipitated to combine into desirable chemical compounds oncethey impinge in a liquid film of collecting electrons.

Thus a precipitator in accordance with the invention has three chief purposes, (1) to control air pollution; (2) to modify the nature of the gas stream; and (3) to combine particulate matter with liquids that wash collecting electrodes into useful and valuable income-bearing products.

For a better understanding of the invention, as well as other objects and further features thereof, reference is made to the following detailed description to be read in conjunction with the accompanying drawing, wherein:

FIG. 1 is an elevational view of one preferred embodiment of a wet electrostatic precipitator in accordance with the invention, the view being in section and being partially schematic in form;

FIG. 2 is a plan view of the precipitator shown in FIG. 1;

FIG. 3 schematically and in section shows details of the collector tube structure;

FIG. 4 is a plan view of the collector tube structure shown in FIG. 3;

FIG. 5 separately shows one of the corrugations included in the collector tube structure shown in FIG. 4;

FIG. 6 illustrates the manner in which the deflector cover is supported over a collector tube structure;

FIG. 7 is an alternative form of collector tube structure;

FIG. 8 is an elevational view of a modified form of wet electrostatic precipitator in accordance with the invention;

FIG. 9 is a plan view of FIG. 8;

FIG. 10 is a section taken through one of the discharge electrode supports shown in FIG. 9;

FIG. 11 is a plan view of the filter included in FIG. 10; and

FIG. 12 shows a modified form of collector tube structure which may be heated or cooled.

Referring to the drawing and more particularly to FIGS. 1 and 2, there is shown a preferred embodiment of a wet precipitator of multi-concentric construction comprising three concentrically disposed tubes 10, 11 and 12, of progressively increasing diameter, which define two concentric annular gas channels or passages A and B having the same radial dimensions or cross-sectional widths.

The tubes are vertically arranged, the inlet for the gaseous stream to be purified being at the lower end, and the gas outlet being at the top end of the tubes. While a system with two concentric channels is shown, it will be appreciated that the system may be enlarged to include three or more concentric channels, all having the same radial dimensions, thereby enormously increasing the operating capacity of the system without waste space and without raising the voltage requirements, in that the air-gap remains constant.

Tubes 10, 11 and 12 are of double-walled or hollow construction to provide space for plumbing in order to supply liquid to the tubes. A set of conduits 13 feeds fresh water or whatever other liquid is used in the system through the interior of the tubes to the upper end thereof, the liquid striking annular, concave covers or deflectors 14, 15 and 16, which are mounted slightly above the upper ends of the tubes and are adapted to cause the liquid impinging thereon to flow down the walls of the tubes. The arrangement is such that deflector 14, which is open on only one side, acts to cause liquid to flow only on the outer surface of tube 10, while deflector 15, which is open on both sides, acts to cause liquid to flow on both the inner and outer surfaces of tube 11, whereas deflector 16, open on only one side, acts to cause liquid to flow on the inner surface of tube 12.

The downwardly-flowing liquid on these surfaces runs into a conduit 17 which carries contaminated liquid into a drain, or suitable vessel if it contains valuable byproducts. Thus the tube surfaces which line passages A and B, have fluid films produced thereon which act as collector electrodes.

It is to be noted that fresh-water conduit 13 runs within conduit 17 for the contaminated liquid, which in turn runs within a conduit 18 which supplies filtered air to the input terminal 19 of scavenging assembly 20 of the discharge electrode support 21, to prevent its contamination by dirt or other foreign matter. This scavenging assembly makes use of aerodynamic vanes of the type disclosed in my prior U.S. Pat. No. 3,238,702, and in particular, FIGS. 4, 5, 6, in said patent. The arrangement is such that air is cyclonically directed and forced against the exposed surface of the insulating support to remove all scale and dirt therefrom to maintain the insulating qualities thereof.

Support 21 is an insulating rod on top of which is attached a conductive spider 22 formed by three horizontal cantilever arms 22A, 22B and 22C, from which are suspended two cylindrical cages or discharge-electrode structures. Discharge-electrode structure 23 is disposed in channel A, and discharge-electrode structure 24, in channel B.

A high voltage of suitable magnitude is supplied by a d-c power supply 25. One side of the supply is connected through cable 26 to input terminal 19 which is electrically coupled to the conductive spider 22 and hence to the discharge-electrode structures. The other side of power supply 26 is grounded at 27, as is the water supply fed to the collector tubes. Hence an electrostatic field is established between the liquid films which line the annular passages A and B and the associated discharge-electrode structures 23 and 24.

Contaminated gas is introduced through the bottom end of passages A and B through radial Venturi slots 28 and 29, respectively, the gas being subjected to the high-voltage electrostatic field which causes solid and semi-solid particles in the gaseous stream to become ionized and to migrate to the collecting films on the surfaces of the tubes lining the passages. These liquid films carry the extracted matter down conduit 17 into a drain or vessel.

The Venturi slots 28 and 29 cause the gas entering the passages to expand, the expanding gas flowing upwardly in countercurrent relationship to the downwardly-flowing liquid, and forcing the liquid against the surfaces of the tubes to produce a uniform film thereon, thereby avoiding dry patches on the surfaces and preventing liquid droplets from entering the gas-flow passages, which droplets give rise to arcing and other deleterious effects.

In order to enhance and broaden the versatility of the precipitator unit for product recovery, the precipitator is equipped with circular concentric conduits 31A, which communicate with standpipes 31. A vessel 32 is provided containing a chemical compound or a gas incorporating desired aerosols. These chemical compounds or aerosols, are pumped by a suitable gas or liquid pump 32 into conduits 31A and injected by the standpipes into the gas stream at the Venturi slot entrances. If necessary, the liquid compounds can be atomized through appropriate nozzles at the upper end of standpipes 31.

The atomized chemical substances or aerosols, are designed to mix with effluent gases to effect a predetermined chemical reaction. This by-product is precipitated, in turn, into a liquid film of predetermined chemical characteristics on the collecting electrodes to cause a secondary desirable chemical reaction. For example, ammonia gas cannot be precipitated — however, if a mist of hydrochloric acid is injected through standpipes 31 into ammonia-laden gas passing through the passages, the atomized hydrochloric acid interacts with ammonia forming ammonia-hydrochloride which is a solid substance and, therefore, can be precipitated.

Ammonia-hydrochloride, being soluble in water, is then drained through conduit 17 into a suitable vessel to be marketed. It is also possible to meter the amount of hydrochloric acid so the odors of ammonia and chlorine are neutralized. Thus, this precipitator may be successfully used in fertilizer plants — some of which are notorious for the emission of ammonia fumes having a deleterious effect on animal and plant life. Thus using various chemical compositions in the liquid that washes the collecting electrodes, plus injections of various chemical compounds and aerosols, the precipitator can be used as a chemical plant in which these chemical compounds and aerosols are combined with precipitated matter forming valuable substances which can be easily recovered and marketed.

Since this electrostatic precipitator is of a wet type in which liquid acts as the collecting electrode, tubes 10, 11 and 12 which constitute the supporting structure of the collecting electrodes may be constructed of any suitable material having adequate structural properties regardless of whether it is insulating or conducting in character. However, it is preferable that the materials used have porous characteristics and possess a high degree of wetability.

A preferred form of a collector tube is shown in FIG. 3, wherein the collecting electrode 10 comprises two concentric cylindrical walls 10A and 10B which are of such relative diameter as to form an intermediate slot 10C through which liquid can be introduced into the trough 10D on the top of the collecting electrode structure. In order to achieve rigidity in the system, vertical webs W or spaces may be attached to the inner surfaces of walls 10A and 10B as shown in FIG. 4. Once the liquid fills trough 10D, it spills over lips 10E and 10F on either side thereof to form a film F into which particulate matter impinges under the influence of a high potential applied to the discharge electrode. This liquid film passes between the wall of the collecting electrode structure and the Venturi 28 to the drain conduit 17 as in FIG. 1. The liquid can be introduced into the system either directly through the slot 10C or as shown in FIGS. 4 and 5, through corrugation inserted Co into slot 10C so as to further control the volume of liquid. In order to create circular motion water in trough 10D the corrugations Co may be inclined as shown on FIG. 5.

As another alternative, the liquid can be introduced through the series of standpipes St as shown on FIG. 6. As these standpipes approach trough 10D, they can be bent approximately at a right angle to eject water horizontally into depressions 10G and 10H, causing the water to rotate in the trough 10D. These corrugations and standpipes are arranged to be removable for cleaning. However, in order to minimize the service, both corrugations and standpipes are made of such materials as plastic, nylon and teflon to which calcium and other particulate matter in the water do not adhere. Slot 10C and trough 10D may be lined with similar material for the same purpose.

When the gas passes through the precipitator at high velocity, a concave circular mushroom-like deflector 15 is provided at the top of the collecting electrode tube. This deflector is supported on the tube by brackets 30, as shown in FIG. 7 of stream-like cross-sectional shape, to minimize the interference with the circular flow of liquid. This mushroom deflector prevents peeling of the liquid film from the lips 11E and 11F by fast-moving gasses. When a mushroom deflector or cover is used, it is possible to force liquid through slot 10C under sufficient pressure so that it strikes at the inner surface of the cover and splashes sideways to form the film of liquid on the collecting electrodes. In order to facilitate formation of such film, the mushroom cover 15, at its lower edge as shown in FIG. 3 forms a lip 15A bent inwardly to direct liquid toward the collecting electrode. The mushroom cover of the last outside collecting electrode is rigidly attached at a point on the outside surface of the collecting electrode structure so that liquid spills only on the inside wall of said collecting electrode structure.

FIGS. 8 and 9 illustrate a second embodiment of the multi-concentric wet precipitator, which differs from that shown in FIGS. 1 and 2, mainly in the manner in which the spider 22 for the discharge electrodes is supported. In FIGS. 1 and 2, the spider support is at the central hub of the spider, whereas in FIGS. 8 and 9, the spider 22 is supported at the ends of arms 22A, 22B and 22C by supporting columns 21A, 21B and 21C, which are outside the periphery of the outer collector tube 12 and are provided with scavenging means equivalent to those previously shown.

In the scavenging arrangement, as best shown in FIGS. 10 and 11, ambient air is sucked through a filter 33 on which the insulating column 21A is mounted, the filter being formed by inclined vanes 34 to create a cyclonic air flow, which flow is directed by stators against the column. The suction force is produced by the upward flow of gas through the precipitator channels, which creates a vacuum and tends, therefore, to draw in ambient air through the only available inlets, which are those in the filter.

It is also to be noted that since there is no longer an insulating column in the center of the concentric tube structure, it is now possible to use this space for precipitation purposes as a tubular gas passage C. A discharge-electrode rod 35 is suspended from the spider coaxially within passage C, the deflector 14 on top of the central tube 10 being arranged in this instance, to produce a water film on the inside surface, as well as the outside surface, to provide both a collector for passage C and a collector for passage A.

Since this wet precipitator will have to process hot gasses, the collecting electrodes will have to be cooled to prevent excessive evaporation of liquid and, conversely, the unit may be used in a frigid climate, in which case the collecting electrodes will have to be heated to prevent freezing. To accomplish this, as shown in FIG. 12 either in the slot 10C or in the walls 10A and 10B of the collecting tube electrodes, coils 36 are inserted for carrying either a refrigerant to cool the tubular structure or hot liquids to heat the structure. These coils are connected by suitable plumbing pipes 37 that passes through the supporting frame to a refrigeration or heating plant 38. As an alternative, calrods or other heating elements may be inserted in a system parallel with the refrigerating coils to prevent freezing of the liquid of the collecting electrodes. In situations experiencing mild variation of temperatures, the liquid that comprises the film on the collecting electrodes could be preheated or precooled to accomplish similar results.

While there have been shown and described, preferred embodiments of multi-concentric, wet electrostatic precipitator in accordance with the invention, it will be appreciated that many changes and modifications may be made therein without, however, departing from the essential spirit of the invention as defined in the annexed claims. Thus the concentric gas passages need not have the same radial dimensions to produce identical air gaps. It is also possible to have passages with different radial dimensions as long as the voltages applied to the discharge electrodes in the gap are appropriate to the gap dimensions.

What I claim is:

1. An electrostatic wet precipitator comprising:
   a. concentrically arranged collector tubes defining at least one vertically-disposed annular gas passage, said collector tubes having hollow walls, corrugations being disposed between the hollow walls and making an acute angle with respect to the horizontal plane to impart a circular motion to liquid fed to the upper end thereof,
   b. means to produce downwardly-flowing films of liquid on the complementary surfaces of adjacent tubes which line said passage thereby to form liquid collectors, said means including conduits running through said hollow walls to supply liquid to the upper ends of the tubes to spill over the walls thereof, and a concave deflector above the upper end of each tube to direct liquid impinging thereon down the inner and outer surfaces of the tube,
   c. a discharge-electrode structure disposed within said passage in spaced relation to said liquid collectors;
   d. inlet means including a Venturi opening to feed a contaminated gaseous stream into the lower end of each passage to produce an expanding gas which flows upwardly through said passage in countercurrent relationship to said liquid films to force said films against said surfaces to maintain the uniformity thereof,
   e. means to apply a high voltage between said discharge-electrode structure and said liquid collectors to ionize the contaminants in the gaseous stream flowing through said passage to cause migration of contaminants toward said liquid collectors and thereby purify the gas; and
   f. outlet means at the upper end of said passage to discharge the purified gas.

* * * * *